US005853899A

United States Patent [19]
Anderson et al.

[11] Patent Number: 5,853,899
[45] Date of Patent: Dec. 29, 1998

[54] AQUEOUS INK RECEPTIVE INK JET RECEIVING MEDIUM YIELDING A WATER RESISTANT INK JET PRINT

[75] Inventors: Brian L. Anderson, Chicopee, Mass.; Brenda M. Warren, South Hadley, Mass.

[73] Assignee: Rexam Graphics Inc., South Hadley, Mass.

[21] Appl. No.: 743,370

[22] Filed: Nov. 4, 1996

[51] Int. Cl.[6] .................................................... B23B 23/08

[52] U.S. Cl. ......................... 428/507; 428/341; 428/342; 428/510; 428/511; 418/514; 524/492; 524/493

[58] Field of Search .................................... 524/492, 493, 524/442; 428/326, 327, 331, 507, 510, 511, 514, 341, 342; 523/161

[56] References Cited

U.S. PATENT DOCUMENTS

| | | | |
|---|---|---|---|
| 4,092,457 | 5/1978 | Fujita et al. | 428/341 |
| 5,223,338 | 6/1993 | Malhotra | 428/342 |

*Primary Examiner*—Edward J. Cain
*Attorney, Agent, or Firm*—Burns, Doane, Swecker & Mathis, L.L.P.

[57] ABSTRACT

Provided is a receiving medium comprising a substrate and an ink receiving layer provided thereon, said ink receiving layer comprising a blend of an ethylene vinylacetate copolymer and a hydrolyzed polyvinyl alcohol. The ink receiving layer preferably further comprises a solid particulate such as silica or calcium silicate. Also provided is a process for providing a water resistant ink jet print by attaching droplets of a recording liquid on a recording medium, said recording medium comprising an ink receiving layer provided on a substrate with the ink receiving layer comprising a blend of an ethylene vinylacetate copolymer and a hydrolyzed polyvinylalcohol.

9 Claims, No Drawings

AQUEOUS INK RECEPTIVE INK JET RECEIVING MEDIUM YIELDING A WATER RESISTANT INK JET PRINT

BACKGROUND OF THE INVENTION

1. Field of the Invention

The present invention relates to an ink jet receiving medium. In particular, the present invention relates to an ink jet receiving medium which yields a U.V. and water resistant ink jet print and a process for providing such a U.V. and water resistant ink jet print.

2. Description of Related Art

Printers using sprayable inks, such as ink jet printers, have become more popular in recent years due to a number of desirable features. Specifically, these systems operate quietly at high speed without the need for external developing or fixation procedures. Moreover, through the use of multiple ink jet heads various colors may be obtained which are suitable for a variety of applications. These printers typically employ ink jet heads having small orifices that propel ink droplets and are used in various electronic printing applications. Various methods for ejecting droplets of ink have been developed. These methods include the use of an electrostatic attraction system, the use of a piezoelectric element to impart mechanical vibration or displacement to the ink, and pressurizing the ink by heating. Thus, it is no wonder that such a recording method which generates less noise and is capable of performing high-speed printing and multi-color printing is in great demand.

Ink jet systems are typically comprised of three components: the printer, the ink and the receptor. The printer controls the size, number and placement of the ink droplets and contains the transport system. The ink provides the colorants which form the image, and the receptor provides the medium which accepts and holds the ink. The quality and stability of the resultant ink jet print is a function of the system as a whole. However, the composition and interaction of the ink and the receptor material most affect the quality and stability of the imaged product.

More specifically, it is desired that the ink be absorbed as rapidly as possible, and that the spread of ink droplets be adequate. The resultant image should be excellent in storability, durability and water resistance.

Ink compositions which are useful in ink jet recording systems are well known and generally contain water, organic solvents and dyes. European Patent 0,294,155 discloses an ink jet composition useful in ink jet recording consisting of a water based vehicle containing about 30–99% wt. water with the balance made up of high boiling solvents such as glycol, glycol ethers, pyrrolidones and amides. The inks contain preferably acid or direct dyes. Optionally, a polyhydric alcohol is added for the prevention of the clogging of nozzles and improvement of ejection stability.

Typically, ink jet systems fall broadly into two categories; those that employ high organic solvent-water based inks, and those that are essentially aqueous. The resultant ink jet print using either of these types of ink has generally been found to exhibit a water resistance for which improvement is desired (i.e., the dye image leaches out or the image layer containing the dye dissolves when contacted with water). Additionally, the dye image is prone to smudging.

Ink jet film compositions are normally sensitive to water and the print can dissolve and leach out. Also, under humid conditions, the print can bleed thereby losing definition. This deterioration is generally accentuated when the inks employ high boiling solvents, such as glycols. Conventional ink jet prints often lack light resistance and good file aging properties as well. A solution to all the above shortcomings is required to achieve acceptable print stability.

Polymeric films for use as recording media represent a special problem in ink jet recording because their surfaces are hydrophobic or quasi-hydrophobic. Even when their surfaces are treated with special coatings to accept and absorb the inks, it is difficult to obtain the requisite qualities of image density and resolution without incurring tack, smear, image bleed, water solubilization of the ink receptive matrix, or other undesirable properties.

The use of water/glycol ink systems presents a special problem. At high humidities, a phenomenon described as image bleed, occurs. The ink jet printer applies small ink droplets in a selective pattern to form the images. These droplets are absorbed into the coating on the film surface to form dots. After initial absorption, the dye continues to spread laterally. Some post imaging spread is desirable to fill in the white areas between the dots and obtain good image density. At high humidities, however, this spreading continues and causes the image to spread excessively, that is, to bleed thereby losing image sharpness or resolution.

Various attempts have been made to solve these problems in an effort to provide the optimal receptor. Approaches to the problem of hydrophobic surfaces include the use of polymers alone or in admixture as ink receptive coatings; see for example, U.S. Pat. Nos. 4,503,111; 3,889,270; 4,564,560; 4,555,437 and 4,578,285. Multiple coatings have also been employed in trying to overcome the various problems associated with the hydrophobic nature of recording media; illustrative of these coatings are those described in U.S. Pat. No. 4,379,804, Japanese Patent Number 01041589 and Japanese Disclosure Numbers 86-132377; 86-074879 and 86-41549. Additionally, the use of mordants to help fix the dye and minimize bleed has been the subject of a number of patents, including U.S. Pat. Nos. 4,554,181; 4,578,295 and 4,547,405.

Moreover, there is a strong demand for a recording medium having light transmissivity and a recording medium having gloss on the surface. In these cases it is essential that the surface of the recording medium be non-porous. In this regard, in order to enhance ink affinity and ink receptivity, it has been the practice in the prior art to use a recording medium comprising a non-porous ink-receiving layer formed by use of a water-soluble polymer.

For example, U.S. Pat. No. 4,503,111 assigned to Tektronics discloses a recording medium having a non-porous ink-receiving layer formed by using primarily a polyvinylpyrrolidone. However, such a recording medium has various problems. These problems include a recorded image low in light fastness, or that due to the stickiness of the surface of the inked receiving layer, blocking is liable to occur, when the printed media are placed upon one another, or when paper is superposed on the recorded surface.

U.S. Pat. No. 5,206,071 to Atherton et al. relates to film mediums useful in ink jet printing which films comprise a transparent, translucent or opaque substrate, having on at least one side thereof a water-insoluble, water-absorptive and ink-receptive matrix comprised of a hydrogel complex and a polymeric high molecular weight quaternary ammonium salt.

U.S. Pat. No. 4,877,680 to Sakaki et al. relates to a recording medium comprising a substrate and a non-porous ink receiving layer. The ink receiving layer contains a water-insoluble polymer containing a cationic resin. The recording medium may be employed for recording by attaching droplets of a recording liquid thereon.

U.S. Pat. No. 4,576,867 to Miyamoto relates to an ink jet recording paper wherein by attaching a cationic resin having a structure represented by the following general formula (I) to at least the surface of an ink jet recording paper, the water-resistance and the sunlight fastness of the image formed on the ink jet recording paper can be improved:

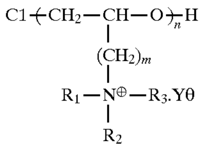

(I)

wherein $R_1$, $R_2$ and $R_3$ represent alkyl group; m represents a number from 1 to 7; n represents a number from 2 to 20; and Y represents an acid residue.

European patent publication 0,500,021 A1 relates to a recording method and recording film comprising a transparent substrate, a porous alumina hydrate layer formed on the substrate and an opaque porous layer laminated on the alumina hydrate layer.

One of the major drawbacks of an ink jet print has always been the lack of long term durability of the images. Ink jet prints have always been prone to UV light fade, and moisture sensitivity. Since the majority of the ink jet inks currently used in desktop and graphic arts applications are composed mainly of water, the ink jet receiver coatings need to be water receptive. The challenge is to develop a hydrophilic, aqueous ink receptive coating that yields a water resistant ink jet print.

Accordingly, an object of the present invention is to provide a novel recording medium for ink jet recording which is particularly excellent in ink receptivity, sharpness and water resistance.

Another object of the present invention is to provide a recording medium for ink jet recording which is excellent in water resistance, even under highly humid conditions, and also free from migration or leaching of the print ink when water droplets contact the surface of the recorded image, or when left to stand under highly humid conditions.

Still another object of the present invention is to provide a water resistant ink jet print and method thereof.

These and other objects of the present invention will become apparent upon a review of the specification and the claims appended thereto.

SUMMARY OF THE INVENTION

According to one aspect of the present invention, there is provided a receiving medium comprising a substrate and an ink receiving layer provided thereon, said ink receiving layer comprising a blend of an ethylene vinylacetate copolymer and a hydrolyzed polyvinyl alcohol.

According to a further aspect of the present invention, there is provided a process for providing a water resistant ink jet print. The method comprises attaching droplets of a recording liquid on a recording medium, said recording liquid containing a water-soluble dye, water and an organic solvent, and said recording medium comprising an ink receiving layer provided on a substrate, with the ink receiving layer comprising a blend of an ethylene vinylacetate copolymer and a hydrolyzed polyvinylalcohol. In a most preferred embodiment, the ink receiving layer further comprises a solid particulate such as silica.

DETAILED DESCRIPTION OF PREFERRED EMBODIMENTS

The present invention relates to an ink jet recording medium. The ink jet recording medium of the present invention comprises a receiving layer which is water resistant and offers long term durability of the printed image, which includes a blend of an ethylene vinylacetate copolymer and a hydrolyzed polyvinyl alcohol. For it has been found that ethylene vinylacetate copolymers form the backbone of an excellent water resistant ink jet coating, which coating can also provide ink jet prints exhibiting excellent UV light resistance and resistance to moisture sensitivity.

In particular, the ethylene vinylacetate copolymers are blended with a hydrolyzed polyvinyl alcohol. An ethylene vinylacetate copolymer is important for the purposes of the present invention as use of simply a polyvinyl acetate does not provide a receiving layer which exhibits the same level of water fastness as the ethylene vinylacetate copolymers. Any ethylene vinylacetate copolymer will generally be suitable for purposes of the present invention. Such copolymers are commercially available, e.g., such as random ethylene vinylacetate copolymers available from Air Products and Chemicals, Inc.

It is also important to blend the ethylene vinylacetate copolymer with a hydrolyzed polyvinyl alcohol to achieve the water resistance as well as long term durability of the printed images. The polyvinyl alcohol is most preferably fully hydrolyzed, which is 98–99% hydrolyzed. The polyvinyl alcohol should generally be at least 88% hydrolyzed for purposes of the present invention.

The blend of ethylene vinylacetate copolymer and hydrolyzed polyvinyl alcohol can range from about 0.5:1 to about 15:1 in weight ratio of the ethylene vinylacetate copolymer to the polyvinyl alcohol, with a weight ratio of from 1:1 to about 4:1 being most preferred. Ethylene vinylacetate copolymers and hydrolyzed polyvinyl alcohol are both commercially available, for example, from Air Products and Chemicals Inc. of Allentown, Pa.

The blend of polymers used as the receiving layer of the recording medium can also include solid particulates such as pigments. The addition of such solid particulates can be added in order to obtain a coating that works well for both dye based and pigmented ink systems. The solid particulates that work best for the present invention are small particle sized hydrated silica. Such silica can be obtained, for example, from Grace Davidson. Another type of preferred particulate that gives both good water fast and print quality properties is synthetic calcium silicate. The use of the calcium silicate such as commercially available Hubersorb 600 from J. M. Huber is preferred as such a calcium silicate has a very high oil absorption.

The blend of ethylene vinylacetate copolymer and polyvinyl alcohol (and optionally solid particulate) can be coated onto a suitable substrate using any conventional coating process or method. A mixture of the polymers, generally in a solution having sufficient water such that the solution has a viscosity suitable for coating, is simply coated onto the substrate using a coating rod or another suitable coating method. Once coated, the coating can be dried using any conventional technique, such as air drying or oven drying.

The substrates upon which coating can be applied can vary greatly. It is preferred that the coating be applied to a substrate such as white film, polyethylene clad paper (photobased paper), adhesive backed vinyl paper, plain paper or canvas. Other suitable substrates can also be coated with the receiving layer in accordance with the present invention to provide an aqueous waterfast ink jet receiver sheet.

The invention will be illustrated in greater detail by the following specific examples. It is understood that these examples are given by way of illustration and are not meant to limit the disclosure or the claims that follow. All percentages in the examples, and elsewhere in the specification, are by weight unless otherwise specified.

The reagents used in the following Examples are commercially available and may be generally described as follows:

Syloid W-300—Hydrated amorphous silica, from W. R. Grace, Baltimore, Md.

Airflex 110—Vinyl acetate/ethylene copolymer latex, from Air Products and Chemicals, Inc. of Allentown, Pa.

Airvol 325—Fully hydrolyzed polyvinyl alcohol from Air Products and Chemicals, Inc. of Allentown, Pa.

Hubersorb 600—synthetic calcium silicate, from J. M. Huber Corporation of Havre de Grace, Md.

Silicon G-100—amorphous silica, from SCM Chemicals of Baltimore, Md.

PVP K90—polyvinyl pyrrolidone molecular weight~1,000,000, from International Specialty Polymers of Wayne, N.J.

Carbowax 1450—polyethylene glycol, molecular weight 1450, from Union Carbide of Danbury, Conn.

Syloid 234—amorphous silica, from W. R. Grace, Baltimore, Md.

Syloid 620—amorphous precipitated silica, from W. R. Grace, Baltimore, Md.

Cyanamer P-21—acrylamide/acrylic acid copolymer, from Cytec Industries Inc. of West Patterson, N.J.

CX-100—aziridine crosslinker, from Zeneca Resins of Wilmington, Ma.

Agefloc A-50HV—poly (Hydroxyalkene Ammonium Chloride), from C.P.S. Chemicals of Old Bridge, N.J.

Zonyl FSN—Nonionic fluorosurfactant, from DuPont of Wilmington, De.

Gafquat 755N—Quaternized copolymer of vinylpyrrolidone and dimethylaminoethyl methacrylate, from International Specialty Products of Wayne, N.J.

EXAMPLE 1

| | |
|---|---|
| Deionized water | 47.16 |
| Syloid W-300 - amorphous silica | 16.81 |
| Airflex 110 - polymer latex | 3.67 |
| 10% Airvol 325 - PVA | 30.26 |
| Agefloc A50HV | 2.02 |
| Zonyl FSN - surfactant | 0.08 |

The above mix was prepared by dispersing the Syloid W-300 amorphous silica in water with a Waring blender for 4 minutes. The Airflex 110 was then mixed for about 5 minutes in a mixer. The final three ingredients (Airvol 325, Agefloc A-50HV, and Zonyl FSN) were added and stirred for an additional 5 minutes.

The composition was then coated onto V400F vinyl with a gapped 130 rod to achieve a coating weight of about 6.0 lb./MSF. The coating was dried in a laboratory Blue M convection oven for 8 minutes at 265° F.

The sample was then printed on an Encad Novajet II ink jet printer using a full color test pattern. Visual densities of cyan, magenta, yellow, red, green, blue, and black were run using an XRITE 938 color densitometer.

The print was allowed to air dry for one hour, then it was completely immersed in water for ten minutes. After immersion, one section of the print containing all seven colors was allowed to air dry for one hour, and then remeasured on the densitometer. The other section was blotted dry to remove excess water, then rubbed with a cloth rag. All results are recorded in Table 1 below.

EXAMPLE 2

The following mixture was prepared in the same manner as described in Example 1. The coating, printing and waterfast testing were all run in the same manner as Example 1. The results can be seen in Table 1 below.

| | |
|---|---|
| Deionized water | 56.41 |
| Hubersorb 600 - calcium silicate | 7.56 |
| Airflex 110 - polymer latex | 3.67 |
| 10% Airvol 325 - PVA | 30.26 |
| Agefloc A50HV | 2.02 |
| Zonyl FSN - surfactant | 0.08 |

Comparative Example 1

The following mixture was prepared in the same manner as described in Example 1. The coating, printing and waterfast testing were all run in the same manner as Example 1. The results can be seen in Table 1 below.

| | |
|---|---|
| Deionized Water | 15.46 |
| Ethanol | 65.68 |
| Silcron G-100 | 6.86 |
| PVP K90 - polyvinyl pyrrolidone | 5.71 |
| Zonyl FSJ - surfactant | 0.18 |
| Glycerin | 6.10 |

Comparative Example 2

The following mixture was prepared in the same manner as described in Example 1. The coating, printing and waterfast testing were all run in the same manner as Example 1. The results can be seen in Table 1 below.

| | |
|---|---|
| Deionized Water | 80.22 |
| Syloid 234 - silica | 5.44 |
| PVP K90 - polyvinyl pyrrolidone | 4.28 |
| Carbowax 1450 | 8.66 |
| Agefloc A-50HV | 1.40 |

Comparative Example 3

The following mixture was prepared in the same manner as described in Example 1. The coating, printing and waterfast testing were all run in the same manner as Example 1. The results can be seen in Table 1 below.

| | |
|---|---|
| Deionized Water | 65.32 |
| Syloid 620 - silica | 2.11 |
| Cyanamer P-21 | 3.67 |
| 28% Ammonium Hydroxide | 1.52 |
| 2-pyrrolidone | 0.44 |
| CX-100 | 0.15 |

TABLE 1

| | Print Quality | Water Immersion (Delta E) | Wet Rub | Wet/Dry Rub | Comments |
|---|---|---|---|---|---|
| Example 1 | Very Good | Black - 1.15<br>Cyan - 2.75<br>Yellow - 1.44<br>Magenta - 1.12<br>Red - 0.54<br>Green - 1.65<br>Blue - 1.49 | Good | Good | No ink seen in water |
| Example 2 | Good | Black - 2.22<br>Cyan - 1.76<br>Yellow - 2.90<br>Magenta - 4.91<br>Red - 3.48<br>Green - 2.95<br>Blue - 1.14 | Good | Good/ Fair | No ink seen in water |
| Comparative Example 1 | Fair | Black - 70.18<br>Cyan - 41.36<br>Yellow - 41.43<br>Magenta - 36.57<br>Red - 86.85<br>Green - 39.82<br>Blue - 41.07 | Poor | Poor | High ink loss in water |
| Comparative Example 2 | Good | Black - 58.12<br>Cyan - 52.25<br>Yellow - 15.38<br>Magenta - 59.71<br>Red - 11.67<br>Green - 7.58<br>Blue - 33.46 | Poor | Poor | Moderate ink loss in water |
| Comparative Example 3 | Good | Black - 0.63<br>Cyan - 3.28<br>Yellow - 1.36<br>Magenta - 1.98<br>Red - 3.67<br>Green - 9.72<br>Blue - 5.67 | Good | Fair | Some ink loss in water |

From the foregoing results, it can be seen that the recording media of the present invention provide an ink jet print exhibiting excellent water resistance and stability as compared to other media containing other recording layers. The recording media of the present invention also provide excellent UV fade resistance for ink jet prints.

While the invention has been described with preferred embodiments, it is to be understood that variations and modifications may be resorted to as will be apparent to those skilled in the art. Such variations and modifications are to be considered within the purview and the scope of the claims appended thereto.

What is claimed is:

1. An ink jet receiving medium having an ink receptive coating on a substrate with the coating being comprised of a blend of an ethylene vinylacetate copolymer and a fully hydrolyzed polyvinyl alcohol.

2. The ink jet receiving medium of claim 1, wherein the amount of ethylene vinylacetate copolymer and hydrolyzed polyvinyl alcohol in the blend is a weight ratio ranging from about 0.5:1 to about 15:1 of ethylene vinylacetate copolymer to polyvinyl alcohol.

3. The ink jet receiving medium of claim 1, wherein the ink receptive coating further comprises a solid particulate.

4. The ink jet receiving medium of claim 3, wherein the solid particulate comprises a silica.

5. The ink jet receiving medium of claim 3, wherein the solid particulate comprises calcium silicate.

6. The ink jet receiving medium of claim 1, wherein the substrate is a clear film, a white film, a polyethylene clad paper, an adhesive backed vinyl paper, plain paper or canvas.

7. A process for providing a water resistant ink jet print comprising attaching droplets of an aqueous recording ink containing a water soluble dye to a receiving medium comprising an ink receiving layer provided on a substrate, the ink receiving layer comprising a blend of ethylene vinylacetate copolymer and a fully hydrolyzed polyvinyl alcohol.

8. The process of claim 7, wherein the ink receiving layer further comprises a solid particulate.

9. The process of claim 8, wherein the solid particulate comprises a silica.

* * * * *